INVENTOR:
GLENN D. JOHNSON
BY: Freling E Baker
HIS ATTORNEY

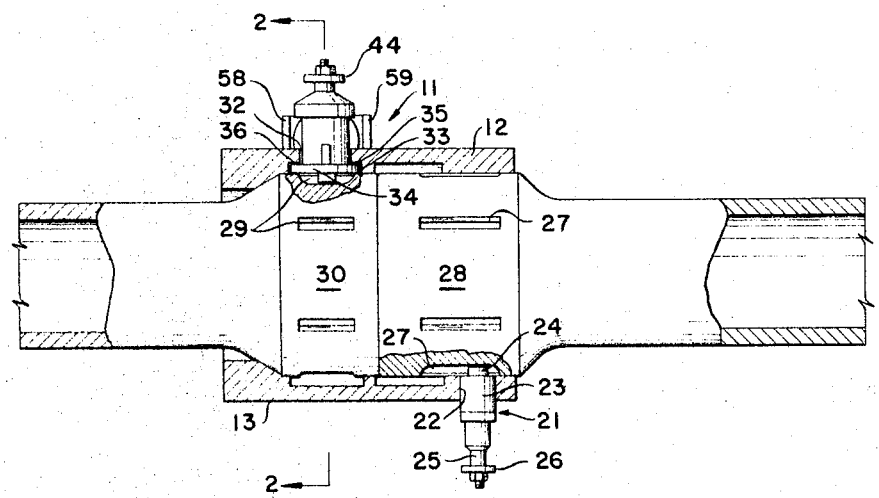
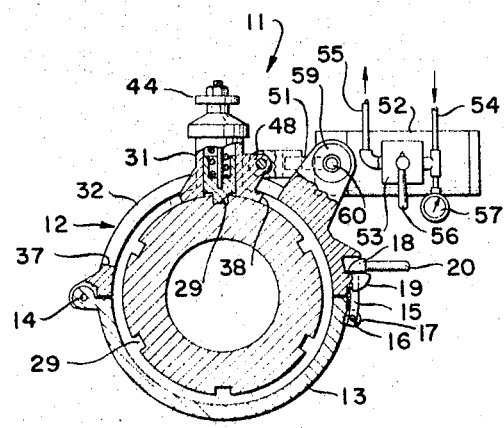
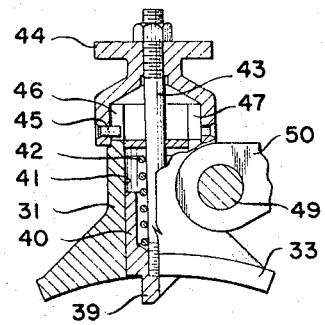

United States Patent Office 3,463,037
Patented Aug. 26, 1969

3,463,037
POWER-TORQUE PIPE TONGS
Glenn D. Johnson, Downey, Calif., assignor to Shell Oil
Company, New York, N.Y., a corporation of Delaware
Filed Sept. 20, 1967, Ser. No. 669,035
Int. Cl. B25b 13/50, 13/04
U.S. Cl. 81—54                               5 Claims

ABSTRACT OF THE DISCLOSURE

The power tongs and the reaction tongs are incorporated along with prime-mover means in the form of a fluid motor in one unit to provide self-contained power-torque pipe tongs wherein the torque and lateral forces are counteracted within the unit.

BACKGROUND OF THE INVENTION

Field of the invention

The present invention relates to pipe tongs and pertains more particularly to self-contained power-torque pipe tongs.

Description of the prior art

The conventional manner of torquing up large diameter pipe is by the use of a pair of pipe tongs or wrenches. One of the tongs is anchored in some manner such as to some fixed or massive nearby structure to serve as reaction means. The other wrench or set of tongs is used to apply the torque either by hand or by means of some power means such as a winch. Further, at least one section of the pipe must be anchored against lateral movement. Often, with the use of such methods, pipe sections are damaged due to excessive bending moments and lateral stresses. Furthermore, such methods are time consuming and generally require the efforts of two or three men.

SUMMARY OF THE INVENTION

It is therefore a primary object of the present invention to overcome the above disadvantages of the prior art methods and apparatus by providing self-reaction power pipe tongs.

A further object of the present invention is to provide improved self-contained power pipe tongs that eliminate the necessity for anchoring the pipe sections.

In accordance with the present invention, the reaction tongs and the power tongs of a pipe tongs unit are incorporated into the body of the same unit so that all torque and lateral forces are counteracted within this same unit.

BRIEF DESCRIPTION OF THE DRAWINGS

Other objects and advantages will become apparent to those of skill in the art from the following detailed description and drawings wherein:

FIGURE 1 is a schematic view partially in section of the present invention showing a pipe coupling or joint positioned for the application of torque thereto;

FIGURE 2 is a view taken along lines 2—2 of FIGURE 1;

FIGURE 3 is a partial sectional view showing the details of the reversing detent for the power pawl;

DESCRIPTION OF THE PREFERRED EMBODIMENTS

Figure 4:
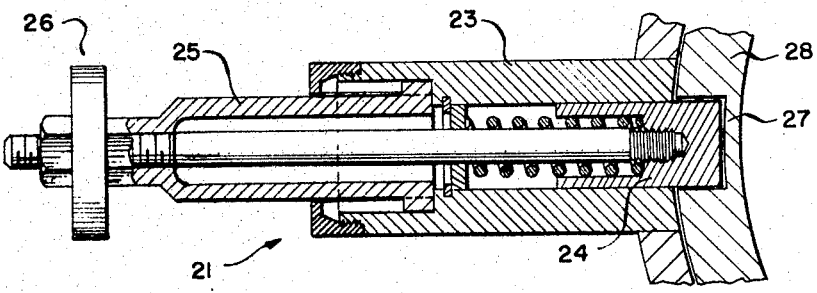
FIGURE 4 is a cross-sectional view taken along lines 3—3 showing the details of the holding pawl of the embodiment of FIGURE 1.

With particular reference to the drawings, a preferred embodiment of the apparatus of the present invention is indicated generally by reference numeral 11 in FIGURES 1 and 2. The main body assembly of the apparatus comprises a pair of semi-cylindrical members 12 and 13 hinged together at 14 to form an assembly which pivots open to receive a pipe joint and latches closed surrounding said joint. When in the latched closed position the assembly forms a substantially cylindrical configuration having a substantially cylindrical throughbore which forms a torque chamber into which the pipe joint is received for the application of torque thereto. The lower body member 13 latches to the main body member 12 in any suitable manner such as, for example, by lever or link 15 pivotably connected by pin 16 to lugs 17 on member 13 and having shoulders 18 which engage lugs 19 or main body member 12. A handle or hand grip 20 extends outward from link 15 to provide means easily grasped by the hand for latching or unlatching the assembly. The lower body member 13 carried stationary or reaction lug or pawl means 21, as seen in FIGURE 4, mounted therein in any suitable manner such as, for example, threads or by press fitting into a hole 22. A plurality of these pawls may be provided if needed. The lug or pawl means 21 comprises a stationary member 23 having a pin 24 spring biased therefrom in a direction toward the center of the housing assembly. The pin 24 is connected to plunger member 25 which extends through fixed member 23 and has connected thereto knob 26 for gripping by the hand to pull the plunger outwardly and consequently the pin 24 out of slot 27 on pipe joint 28.

The movable or power pawl 39 of the present invention is mounted on main body member 12 and engages slots 29 on pipe joint section 30. The power pawl is comprised of pawl carrier means 31 slidably mounted in guide way or slot 32 formed in main body member 12. Flanges 33 and 34 on carrier 31 engages shoulders 35 and 36 of body member 12 to prevent vertical displacement of the carrier member. Carrier 31 moves in an arc along slot or guide way 32 within the limits defined by stops 37 and 38. The power pawl mechanism comprises a downwardly extending pawl 39 formed on slide member 40 which is slidably mounted in bore 41 of carrier member 31. A sloping face or cam surface on one edge of pawl 39 cams it out of slots 29 of the joint section on the backward or idle stroke (clockwise direction in FIGURE 2). A suitable coil spring 42 biases slide member 40 in the downward direction for engagement with slots 29 on pipe joint member 30. Slide 40 is connected by means of a rod or pin 43 in any suitable manner such as by screw threads to reversing knob 44. The reversing knob 44 is held in predetermined angular position of adjustment by detent means in the form of pin 45 which engages slots 46 and 47 in member 31. The pawl carrier member 31 is connected by a pivotal connection comprising lugs 48, pin 49 and link member 50 to a piston rod 51 of prime mover means 52. The prime mover means 52 is a conventional double-acting fluid motor having a cylinder and a double-acting piston reciprocably counted therein and connected to piston rod 51 to transfer power therefrom. Control assembly 53 controls the flow of fluid under pressure from a suitable source of pressurized fluid via supply conduit 54 to the cylinder of the fluid motor. The fluid is exhausted via fluid conduit 55. Control handle 56 is movable into forward or reverse positions to control the direction of fluid motor 52. A suitable gauge 57 is calibrated to indicate torque applied to the pipe joint. The fluid motor 52 is pivotably mounted by means of lugs 58 and 59 and pin 60 on member 12.

Figure 5:
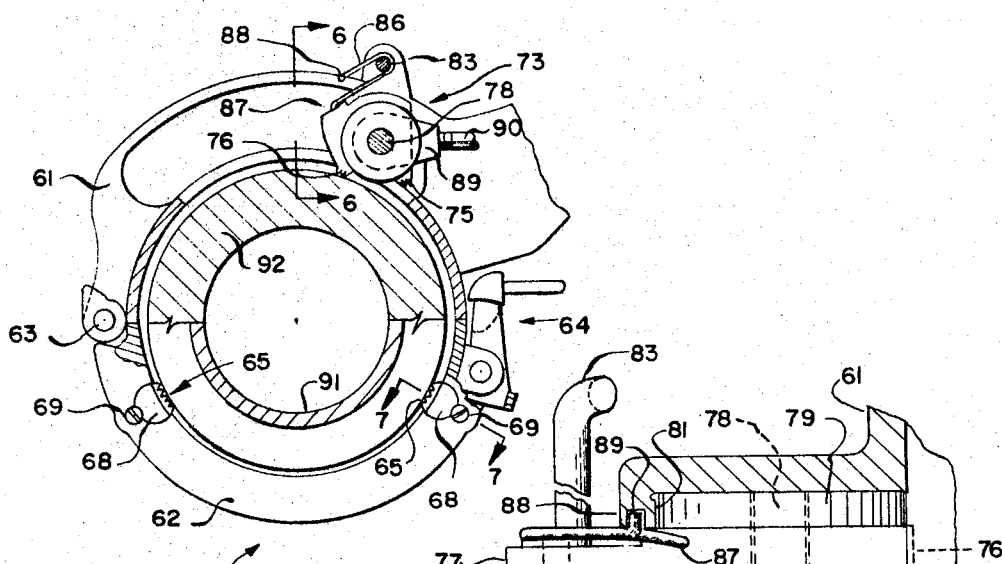
FIGURE 5 is a side elevational view partially in section of a second embodiment of the present invention.
Figure 6:
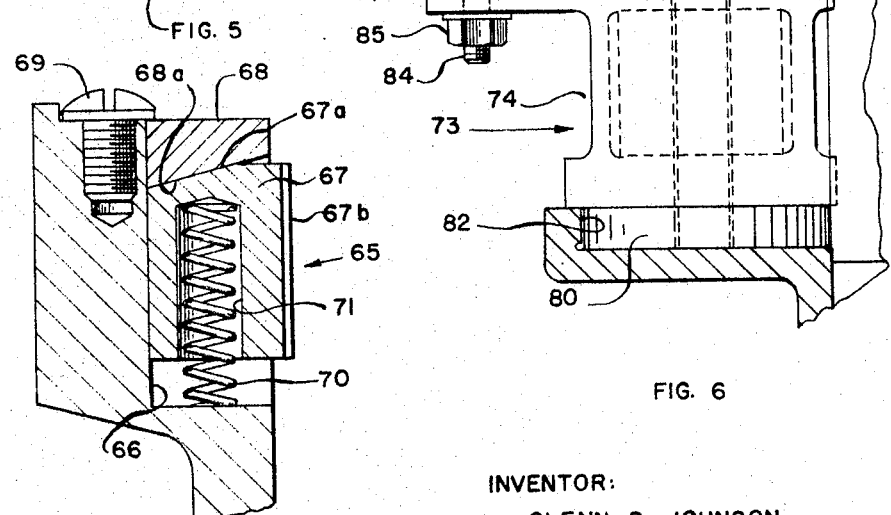
FIGURE 6 is a cross-sectional view taken along lines 6—6 of FIGURE 5.
Figure 7:
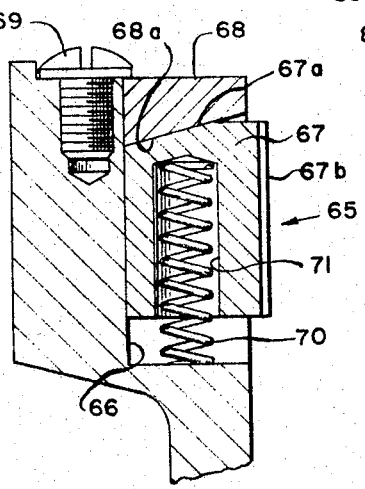
FIGURE 7 is a cross-sectional view taken along lines 7—7 of FIGURE 5.

A second embodiment of the apparatus of the present invention is illustrated in FIGURES 5–7. This embodiment utilizes a novel arrangement of friction-gripping means to grip the tool or pipe joint members. The body or housing means of this particular embodiment is substantially the same as the previous embodiment but with specific provisions for friction-gripping means. The apparatus as illustrated comprises a main body member 61 and the lower body member 62 connected to the main body member by hinge means 63. The body members when in the closed or latched position form body means having a substantially cylindrical throughbore which is adapted to receive each of a pair of joint members. This throughbore in which the joint members are received may be referred to as the torque chamber. The main body member carries both fixed and movable pawl means which cooperate together to apply torque to the pipe joint. A suitable number of holding pawls 65 are spaced circumferentially around the body means to engage and hold one joint of the tool or pipe joint. This embodiment utilizes the friction gripping concept and is in the form of rolling wedge dogs. The specific construction of a rolling wedge dog is more fully detailed in FIGURE 7. In FIGURE 7 a semi-cylindrical seat 66 is formed in the body member 62. A substantially cylindrical rolling wedge dog 67 is mounted in the semi-cylindrical seat 66 and held in place by cap member 68. A binding head cap screw 69 retains the cap member 68 in place. A compression spring 70 seated in bore 71 of member 67 to bias it into engagement with the cap 68 is provided. The rolling wedge dog 67 has a tapered abutting face 67a which abuts against a like tapered abutting face 68a on member 68. A substantially flat friction gripping surface 67b is formed on the outer surface of the rolling wedge dog 67. The wedge dog 67 is free to rotate about its axis in semi-cylindrical seat 66 but is biased to the neutral position by the engagement of abutting surface 67a into engagement with abutting surface 68a under the biasing action of spring 70. The rolling wedge type of holding pawl is responsive to hold the pipe or tool joint member against either direction of rotation.

The power pawl means is movably mounted on the main or upper body member 61. As shown in FIGURES 5 and 6, a power pawl assembly comprises a reversible pawl member 74 having frictional gripping surfaces 75 and 76 and a control arm 77. The pawl member 74 is pivotably mounted on pin 78 which is carried by rollers 79 and 80. The rollers 79 and 80 engage guideways 81 and 82 in the body member of the pawl assembly and placed in the upper body member. The control lever or arm 77 extends upward through the housing between guide members or ways 81 and 82. A control lever 83 is pivotably mounted by means of an eccentric body portion 84 and control arm 77 and is secured such as by a nut 85. A control spring 86 extends around the body of control lever 83 with one end 87 extending into engagement with reversible pawl member 74 and the other end 88 extending into guideway 89. The reversing of pawl member 74 is accomplished by rotating control lever 83 about its pivot shaft 84. The body portion of control lever 83 engages the looped portion of spring 86 and cams it about which 88 which acts as a pivot. This action moves end 87 of spring 86 one way or the other about pivot point 88, thus forcing pawl member 74 in one direction or the other about its pivot point 88. The pawl assembly is connected by rod clevis 89 to piston rod 90 of prime mover means such as that shown in FIGURE 1 which drives the power pawl assembly back and forth in a path along guideways 81 and 82 in the housing when in operation.

OPERATION

In operation of the apparatus of the present invention the two halves of the housing of the present apparatus, that is, the upper body member and the lower body member are clamped around the tool or pipe joint to which torque is to be applied, thus encircling the joint. The apparatus of the present invention is such that the holding pawls engage and hold one of the members of a tool or pipe joint and a power pawl engages the other member. The power pawl is then adjusted such as to apply torque in the proper direction. As shown in the modification of FIGURE 1, the body assembly is positioned such that pin 24 of the holding pawl drops into the slot 27 of the pipe joint 28 to prevent rotation thereof. The power pawl 39 then engages one of the slots 29 on joint member 30. As shown in FIGURE 2, the power pawl 39 will rotate 30 in the counterclockwise direction as it moves to and fro under the action of the prime mover means 52. The pawl 39 will ride up, over or out of the slots on the backstroke in the clockwise direction. The power pawl means as more clearly detailed in FIGURE 3 may be reversed so as to apply torque in the clockwise direction. This is done by lifting slide member 40 by means of knob 44 and rotating the member 180° so that pin 45 clears the slot 46 and engages slot 47.

The second embodiment of the invention shown in FIGURES 5 through 7 utilizes the friction gripping means to grip a pipe or tool joint that does not have the tool engaging slots as shown in the joint of FIGURE 1. The apparatus of this embodiment will grip and apply torque to a joint or pipe that has a smooth surface, thus eliminating the need for alignment of pins and slots as in the previous embodiment. When clamped around the tool or pipe joint the holding pawls 65 are positioned so as to engage one joint of the pipe 91 whereas the power pawl assembly 73 is positioned to engage the other joint of pipe 92. The holding pawls in this embodiment will hold a pipe or section of joint against either direction of rotation and is responsive to torque to increase the gripping action thereof. As the torque is applied to the holding pawl it tends to rotate about its axis and force a portion of the gripping face tighter into engagement with the joint. The power pawl when positioned as shown in FIGURE 5 will apply torque to the pipe joint when driven in a counterclockwise direction and will slide over the surface of the pipe as it is driven in a reverse direction as shown in this particular figure.

I claim as my invention:
1. An apparatus for applying torque to a joint of pipe comprising:
   body means having a substantially cylindrical throughbore adapted to receive each of a pair of joint members;
   said body means comprising first and second substantially semi-cylindrical members hinged together to surround said joint members when closed;
   pawl means carried by said body means adapted to engage one of said joint members;
   power pawl means movably mounted on said body means and adapted to engage the other of said joint members; and
   prime mover means comprising a reciprocable fluid motor mounted on said body means and operatively connected to said power pawl means.

2. The apparatus of claim 1 wherein:
said power pawl means engages a slot in said joint member.
3. The apparatus of claim 1 wherein:
said power pawl means is reversible.
4. The apparatus of claim 1 including:
latch means for releasibly latching said semi-cylindrical members together in a closed position.
5. The apparatus of claim 4 including:
guideway formed in said first body member;
pawl carrying means slidably received in said guideway;
slot means formed in said first body member radially outward of said guide means;
a portion of said pawl carrying means extending outward through said slot;
movable connecting rod extending from said power means and pivotally connected to said pawl carrying means; and
means pivotally mounted said power means on one of said body members.

References Cited
UNITED STATES PATENTS

| | | | |
|---|---|---|---|
| 1,259,670 | 3/1918 | Richard | 81—53 |
| 2,115,104 | 4/1938 | Hamer | 81—54 |
| 2,237,383 | 4/1941 | Agostineto | 81—90 |
| 2,454,317 | 11/1948 | Hambly | 81—53 |
| 2,982,162 | 5/1961 | Golden | 81—90 |
| 3,025,733 | 3/1962 | Soodnizin | 81—53 |
| 3,097,551 | 7/1963 | Schmitt | 81—52.4 X |
| 3,270,823 | 9/1966 | Buehler | 175—85 |

JAMES L. JONES, Jr., Primary Examiner